US010972994B2

(12) United States Patent
Abedini et al.

(10) Patent No.: US 10,972,994 B2
(45) Date of Patent: Apr. 6, 2021

(54) TIMING ADJUSTMENT IN CV2X

(71) Applicant: QUALCOMM Incorporated, San Diego, CA (US)

(72) Inventors: Navid Abedini, Somerset, NJ (US); Zhibin Wu, Sunnyvale, CA (US); Junyi Li, Chester, NJ (US); Sudhir Kumar Baghel, Hillsborough, NJ (US); Kapil Gulati, Dover, DE (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/363,638

(22) Filed: Mar. 25, 2019

(65) Prior Publication Data

US 2019/0306817 A1 Oct. 3, 2019

Related U.S. Application Data

(60) Provisional application No. 62/650,846, filed on Mar. 30, 2018.

(51) Int. Cl.
*H04W 56/00* (2009.01)
*H04W 4/40* (2018.01)
*H04B 1/7073* (2011.01)
*H04B 1/7097* (2011.01)

(52) U.S. Cl.
CPC ........ *H04W 56/005* (2013.01); *H04B 1/7073* (2013.01); *H04B 1/7097* (2013.01); *H04W 4/40* (2018.02); *H04W 56/00* (2013.01); *H04W 56/0015* (2013.01); *H04W 56/0045* (2013.01); *H04B 2201/7073* (2013.01); *H04B 2201/709709* (2013.01)

(58) Field of Classification Search
CPC ........... H04W 56/005; H04W 56/0045; H04W 56/00; H04W 4/40; H04W 56/0015; H04B 1/7073; H04B 1/7097; H04B 2201/7073; H04B 2201/709709
See application file for complete search history.

(56) References Cited

U.S. PATENT DOCUMENTS

| 2015/0271771 | A1* | 9/2015 | Park ................ H04W 56/0015 370/350 |
| 2017/0195110 | A1* | 7/2017 | Ruffini ............. H04W 56/0015 |
| 2017/0215119 | A1 | 7/2017 | Hong et al. |

FOREIGN PATENT DOCUMENTS

KR 20170088490 A 8/2017

OTHER PUBLICATIONS

International Search Report and Written Opinion—PCT/US2019/024028—ISA/EPO—dated Jun. 11, 2019.

* cited by examiner

*Primary Examiner* — Kabir A Timory
(74) *Attorney, Agent, or Firm* — Arent Fox, LLP

(57) ABSTRACT

An aspect of the present disclosure includes methods, systems, and computer-readable media for receiving a first timing reference signal and a second timing reference signal at a local device, wherein the second timing reference signal includes an internal timing reference, receiving a timing indication from a remote device, calculating a timing offset from at least one of a propagation delay, the timing indication, or the first timing reference signal, adjusting the internal timing reference based on the timing offset, and transmitting a message based on the internal timing reference.

27 Claims, 10 Drawing Sheets

TIMING ADJUSTMENT IN CV2X

CROSS REFERENCE TO RELATED APPLICATIONS

The present application claims priority to U.S. Provisional Application No. 62/650,846, filed on Mar. 30, 2018, entitled "Timing Adjustment in CV2X," the content of which is incorporated by reference in its entirety.

BACKGROUND

Aspects of the present disclosure relate generally to wireless communication networks, and more particularly, to apparatus and methods for cellular vehicle-to-everything (CV2X) communication.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

When utilizing CV2X communication, a device such as a user equipment (UE) may synchronize with other devices, such as other UEs or 5G base stations (gNBs) using one or more timing references. Depending on environmental variables, accuracy of a timing reference source, and other factors, certain timing references may be more accurate than others. Improvement in accuracy of the timing reference may improve the signal-to-noise-interference ratio (SNIR), and thus the data throughput. Therefore, it may be desirable for the device to rely on a more accurate timing reference.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for receiving a first timing reference signal and a second timing reference signal at a local device, wherein the second timing reference signal includes an internal timing reference, receiving a timing indication from a remote device, calculating a timing offset from at least one of a propagation delay, the timing indication, or the first timing reference signal, adjusting the internal timing reference based on the timing offset, and transmitting a message based on the internal timing reference.

Certain aspects of the present disclosure may include an apparatus having a memory, a transceiver, and one or more processors operatively coupled with the memory and the transceiver and configured to receive a first timing reference signal and a second timing reference signal at a local device, wherein the second timing reference signal includes an internal timing reference, receive, via the transceiver, a timing indication from a remote device, calculate a timing offset from at least one of a propagation delay, the timing indication, or the first timing reference signal, adjust the internal timing reference based on the timing offset, and transmit, via the transceiver, a message based on the internal timing reference.

One aspect of the present disclosure includes a non-transitory computer-readable medium having instructions stored therein that, when executed by one or more processors at a base station, cause the one or more processors to receive a first timing reference signal and a second timing reference signal at a local device, wherein the second timing reference signal includes an internal timing reference, receive a timing indication from a remote device, calculate a timing offset from at least one of a propagation delay, the timing indication, or the first timing reference signal, adjust the internal timing reference based on the timing offset, and transmit a message based on the internal timing reference.

Some aspects of the present disclosure includes an apparatus having means for receiving a first timing reference signal and a second timing reference signal at a local device, wherein the second timing reference signal includes an internal timing reference, means for receiving a timing indication from a remote device, means for calculating a timing offset from at least one of a propagation delay, the timing indication, or the first timing reference signal, means for adjusting the internal timing reference based on the timing offset, and means for transmitting a message based on the internal timing reference Aspects of the present disclosure include methods for receiving a first timing reference signal and a second timing reference signal at a local device, wherein the second timing reference signal includes an internal timing reference, transmitting a third timing reference signal based on the first timing reference signal or the second timing reference signal to a remote device, and transmitting a message including a timing indication to the remote device.

Certain aspects of the present disclosure may include an apparatus having a memory, a transceiver, and one or more processors operatively coupled with the memory and the transceiver and configured to receive a first timing reference signal and a second timing reference signal at a local device, wherein the second timing reference signal includes an internal timing reference, transmit, via the transceiver, a third timing reference signal based on the first timing reference signal or the second timing reference signal to a remote device, and transmit, via the transceiver, a message including a timing indication to the remote device.

One aspect of the present disclosure includes a non-transitory computer-readable medium having instructions stored therein that, when executed by one or more processors at a base station, cause the one or more processors to receive a first timing reference signal and a second timing reference signal at a local device, wherein the second timing reference signal includes an internal timing reference, transmit a third timing reference signal based on the first timing reference signal or the second timing reference signal to a remote device, and transmit a message including a timing indication to the remote device.

Some aspects of the present disclosure includes an apparatus having means for receiving a first timing reference signal and a second timing reference signal at a local device, wherein the second timing reference signal includes an internal timing reference, means for transmitting a third timing reference signal based on the first timing reference signal or the second timing reference signal to a remote device, and means for transmitting a message including a timing indication to the remote device To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
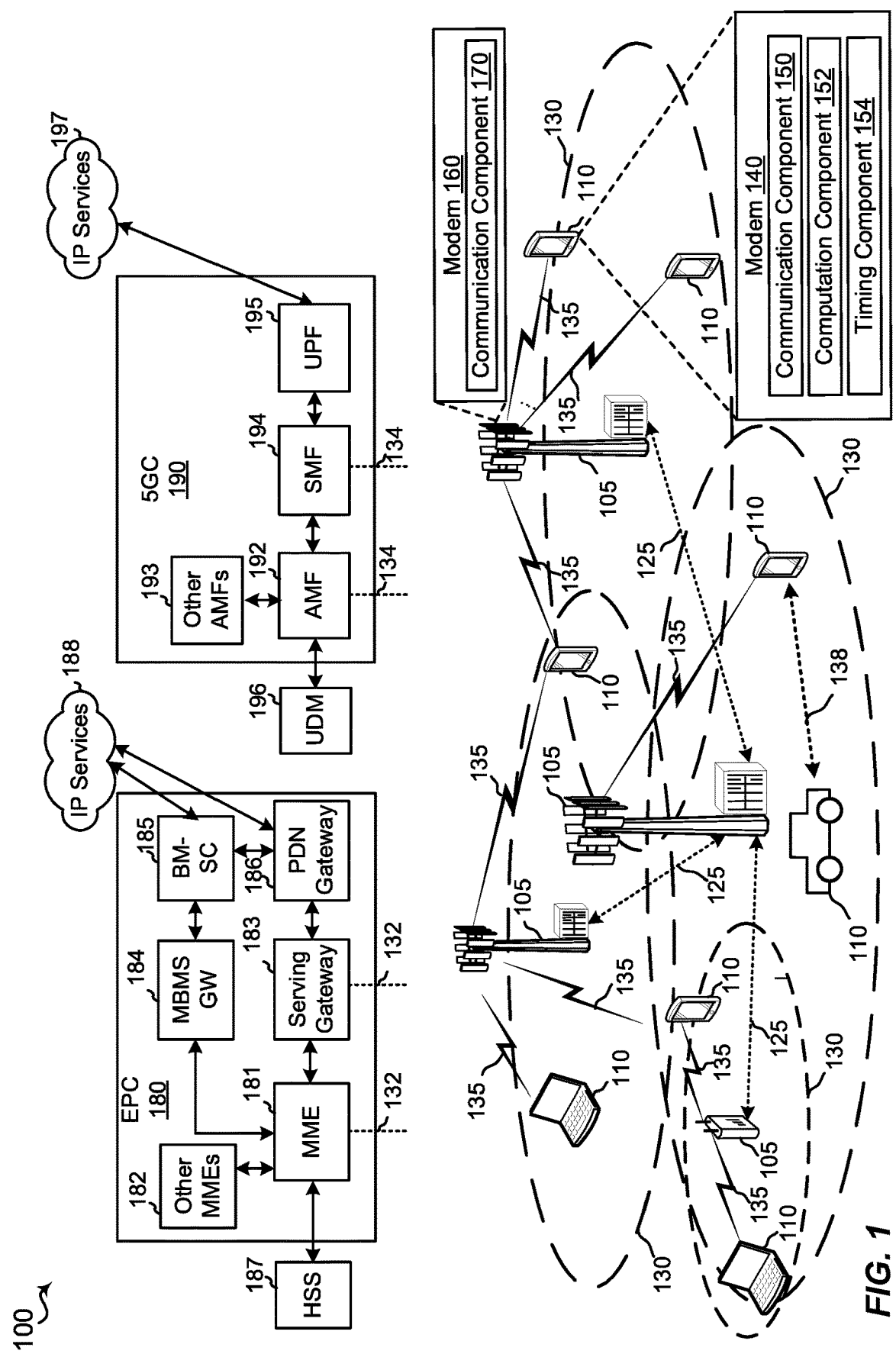
FIG. 1 is a schematic diagram of an example of a wireless communication network including at least one device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

In a CV2X system, two devices (device A and B) may communicate with each other. Each device may have at least two timing references: a timing reference acquired from receiving a signal from another device, and an internal timing reference that may be acquired from an external source of synchronization (e.g. global positioning system (GPS) source or a cellular source). The first timing reference may be similar to a reference acquisition technique used in access network, where a device receives some signals/channels (e.g. sync signals) from a base station, such as a 4G base station (eNB) or a gNB and acquires synchronization from these signals. In an access network, for example, a base station (e.g., eNB or gNB) provides a Timing Advance (TA) command (e.g., in random access channel MSG2 or other messages) to a device. The device adjusts the uplink (UL) transmit (TX) timing based on the TA command. The adjustment would ensure UL transmissions from multiple devices to arrive at the base station (e.g., eNB or gNB) at approximately the same time. For example, in a frequency division duplex (FDD) mode, the TA command may be equal to the round-trip time (2 times the propagation delay, $d_{PROP}$). If the device advances the UL TX timing by ($2d_{PROP}$) with respect to its downlink (DL) receive (RX) timing, the transmission will arrive at the base station (e.g., eNB or gNB) at the symbol boundaries (i.e., with zero offset).

A device may choose one of two timing references, determined based on either or both of the above references. For example, the internal timing reference (e.g. GPS timing) may not be sufficiently accurate (e.g., the GPS timing of a device may be off by −/+12 Ts, where Ts=1/(2048*15000) second), and the timing reference acquired from another device may be selected. An aspect of the present disclosure includes adjusting the internal timing reference using the received timing reference. For example, a device may also be able to adjust the internal timing reference (i.e., Δ). In some implementations, having a more accurate internal timing would be beneficial to reduce the inter-link interference and increase the resource utilization.

Referring to FIG. 1, in accordance with various aspects of the present disclosure, a wireless communication network 100 includes at least one UE 110 including a modem 140 with a communication component 150 configured to communicate with the other UEs 110 and/or base station (BS) 105, such as sending/receiving messages to the other UEs 110 and/or BS 105. The BS 105, for example, may be a gNB or eNB. The modem 140 may further include a computation component 152 configured to calculate the propagation delay and the timing offset values. The modem 140 may include a timing component 154 configured to adjust the Tx and/or Rx timings of the UE 110. The at least one UE 110 may be disposed within vehicles capable of communicating via C2VX technology with other UEs 110.

The wireless network may include at least one BS 105 including a modem 160 with a communication component 170 configured to communicate with the UEs 110 and/or other BSs 105, such as sending/receiving messages to the UEs 110 and/or other BSs 105.

The modem 160 of a base station 105 may be configured to communicate with other base stations 105 and UEs 110 via a cellular network, a Wi-Fi network, or other wireless and wired networks. The modem 140 of a UE 110 may be configured to communicate with the base stations 105 via a cellular network, a Wi-Fi network, or other wireless and wired networks. The modems 140, 160 may receive and transmit data packets.

The wireless communication network 100 may include one or more base stations 105, one or more UEs 110, and a core network, such as an Evolved Packet Core (EPC) 180 and/or a 5G core (5GC) 190. The EPC 180 and/or the 5GC 190 may provide user authentication, access authorization, tracking, internet protocol (IP) connectivity, and other access, routing, or mobility functions. The base stations 105 configured for 4G LTE (collectively referred to as Evolved Universal Mobile Telecommunications System (UMTS) Terrestrial Radio Access Network (E-UTRAN)) may interface with the EPC 180 through backhaul links 132 (e.g., S1, etc.). The base stations 105 configured for 5G NR (collectively referred to as Next Generation RAN (NG-RAN)) may interface with the 5GC 190 through backhaul links 134. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate with each other directly or indirectly (e.g., through the EPC 180 or the 5GC 190), with one another over backhaul links 125, 132, or 134 (e.g., Xn or X2 interfaces). The backhaul links 125, 132, 134 may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The geographic coverage area 130 for a base station 105 may be divided into sectors or cells making up only a portion of the coverage area (not shown).

The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a LTE or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for the EPC 180 or the 5GC 190 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 110 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. Some examples of IoT devices may include parking meter, gas pump, toaster, vehicles, and heart monitor. A UE 110 may be able to communicate with various types of base stations 105 and network equipment including macro eNBs, small cell eNBs, macro gNBs, small cell gNBs, relay base stations, and the like.

In some implementations, the UE 110 may be a vehicle configured to communicate with other UEs 110, e.g. other vehicles, via V2X communication technologies.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using FDD (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

A base station 105, whether a small cell or a large cell (e.g., macro base station), may include an eNB, gNodeB (gNB), or other type of base station. Some base stations 105, such as a gNB may operate in a traditional sub 6 GHz spectrum, in millimeter wave (mmW) frequencies and/or near mmW frequencies in communication with the UE 110. When the gNB, such as a base station 105 operates in mmW or near mmW frequencies, the base station 105 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band has extremely high path loss and a short range. The mmW base station 105 may utilize beamforming with the UEs 110 in their transmissions to compensate for the extremely high path loss and short range.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
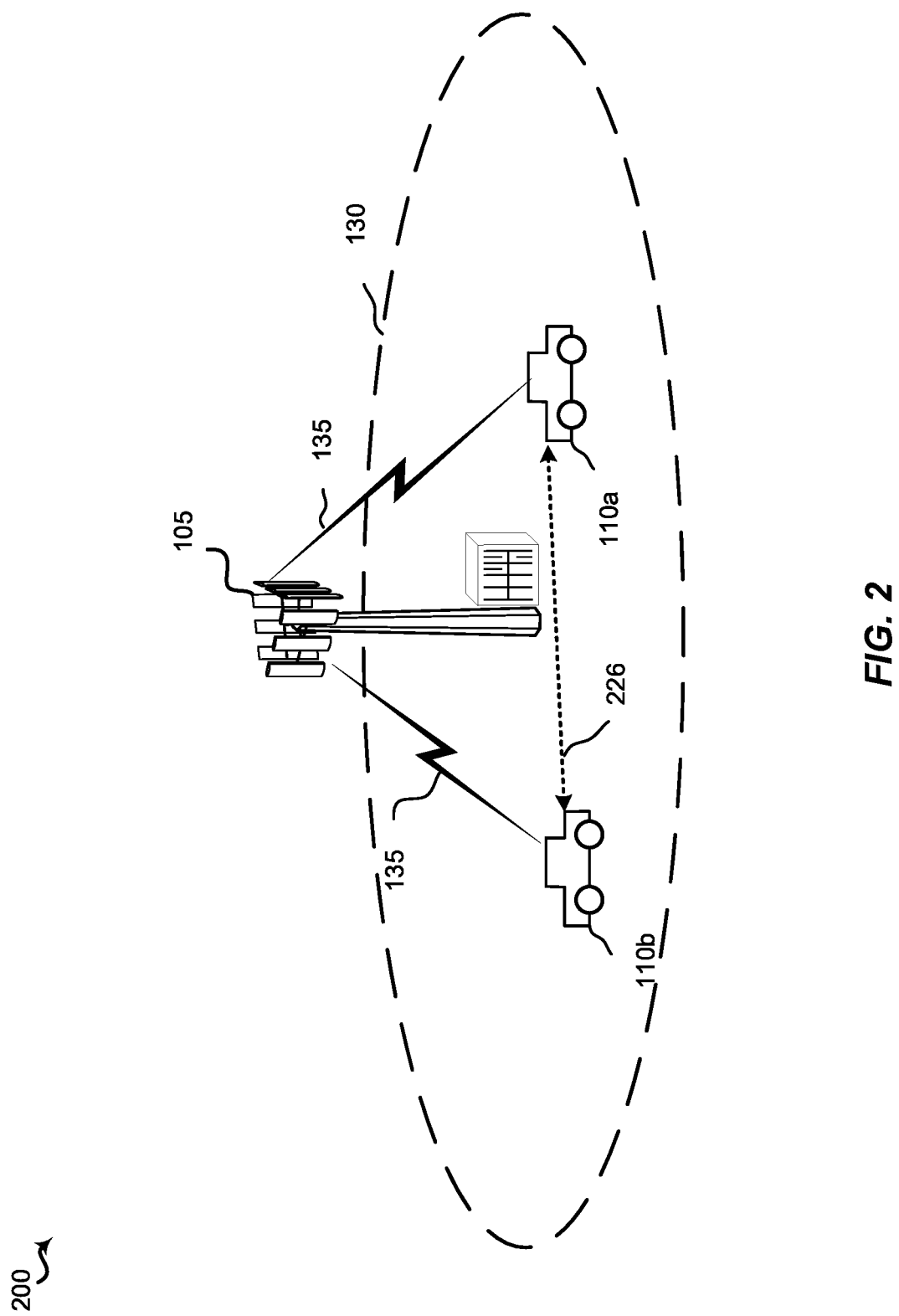
FIG. 2 is a schematic diagram of an example of a timing adjustment among devices.

Referring to FIG. 2, an example of a wireless network 200 may include the BS 105 having the coverage area 130. The wireless network 200 also includes a local device 110a and a remote device 110b. The local device 110a and the remote device 110b may be vehicles configured to wireless communicate via the D2D communication link 138, such as a CV2X link 226. The local device 110a and the remote device 110b may include hardware and software, such as the UE 110 in FIG. 7, for example, to communicate via the CV2X link 226. The BS 105 may communicate with the local device 110a and the remote device 110b via the wireless interface link 135, e.g., a NR wireless interface link.

In certain examples, the local device 110a may receive an internal timing reference signal from the BS 105. The internal timing reference signal may alternatively be based on a GPS. The local device 110a may use the GPS timing to receive and transmit data from/to the remote device 110b and/or the BS 105. The internal timing reference signal based on the GPS may be received from the base station 105, a satellite, or other wireless or wired sources.

In some implementations, the local device 110a may attempt to wirelessly connect with the remote device 110b via the CV2X link 226. The wireless connection may include a RACH procedure (discussed below with respect to FIG. 4). When establishing the wireless connection, the local device 110a may receive a timing indication and an external timing reference signal from the remote device 110b. The external timing reference signal may include an external timing reference maintained by the remote device 110b. The local device 110a may utilize the external timing reference to generate the Rx and Tx timing to communicate with the remote device 110b and/or the BS 105.

In certain implementations, the local device 110a may determine that the external timing reference may be more accurate than the internal timing reference. For example, the local device 110a may determine that the internal timing reference has become outdated. In other examples, the local device 110a may determine that the internal timing reference is less accurate than the external timing reference due to noise and/or interference distorting the internal timing reference signal. Consequently, the local device 110a may adjust the internal timing reference based on the timing indication and/or the external timing reference.

Figure 3:
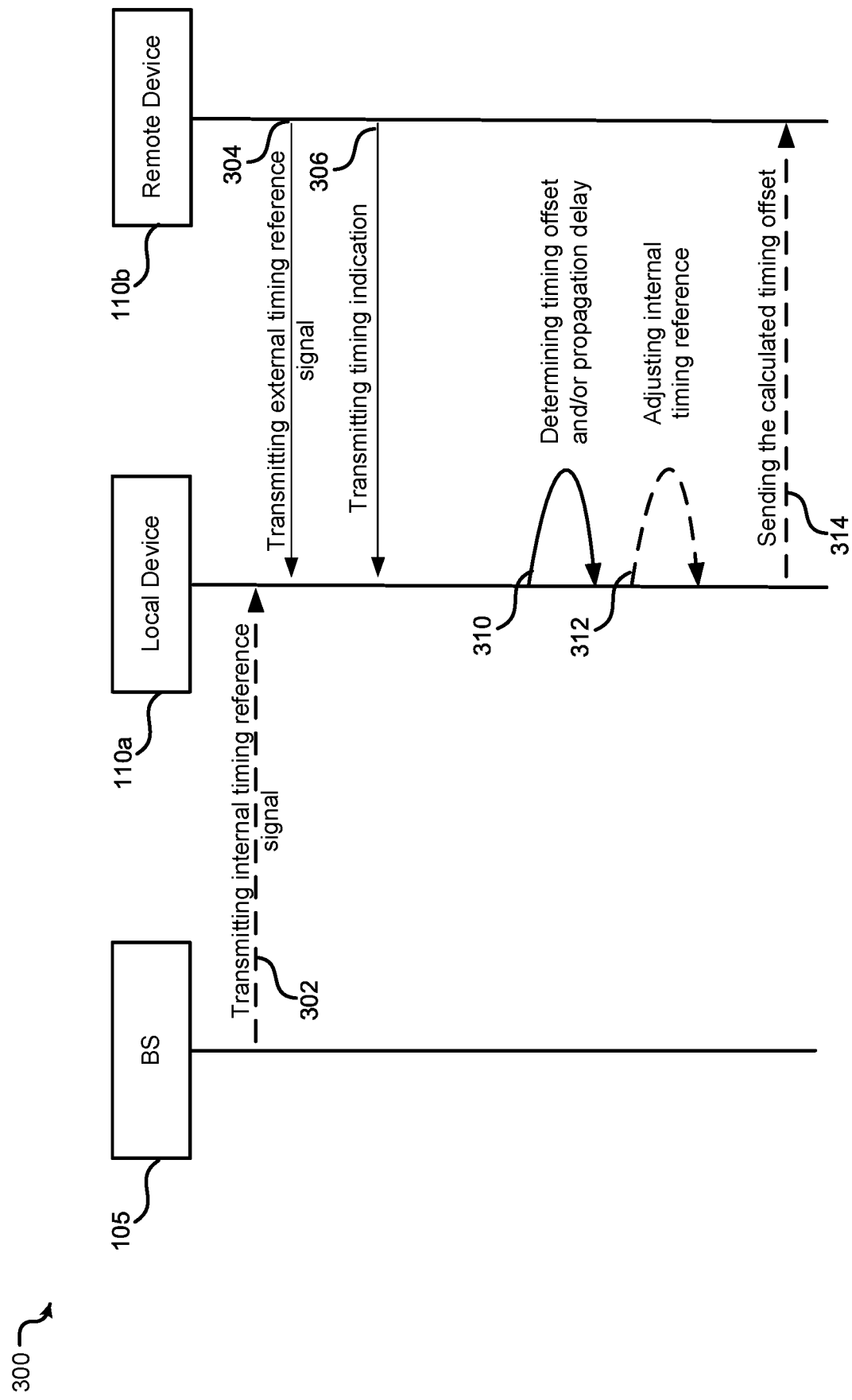
FIG. 3 is a process flow diagram of an example of a timing adjustment between two or more devices.

Referring now to FIG. 3, an example of a flow diagram 300 includes a BS 105 optionally transmitting 302 an internal timing reference in the internal timing reference signal to the local device 110a. The internal timing reference may be a temporal reference used by the local device 110a to synchronize transmission and/or reception. The internal timing reference signal may be the signal used to transmit the internal timing reference. In some examples, the internal timing reference may be alternatively generated based on the GPS of the local device 110a. Next, the remote device 105b may transmit 304 the external timing reference to the local device 110b. The remote device 105b may transmit 304 the external timing reference signal before or after the transmission 302 of the internal timing reference signal by the BS 105. The local device 105a may rely on the external timing reference signal to generate an external timing reference. Next, the remote device 110b may transmit 306 the timing indication to the local device 110a. The timing indication may include information relating to the propagation delay (i.e., time for signals to travel from the remote device 110b to the local device 110a) and/or the timing offset. The timing offset, explained in greater detail with respect to FIGS. 5 and 6, may be the time difference between the internal timing reference for the local device 110a and the internal timing reference for the remote device 110b. The internal timing reference for the remote device 110b may be related to the external timing reference transmitted 304 by the remote device 110b. Based on the external timing reference and the timing indication, the local device 110a may determine 310 at least one of the propagation delay between the remote device 110b and the local device 110a, or the timing offset. Next, the local device 110a may optionally adjust 312 the internal timing reference based on the calculated timing offset. The local device 110a may optionally send 314 the calculated timing offset to the remote device 110b and/or another device. The local device 110a may utilize the timing offset to improve the synchronization of transmission and reception by adjusting the internal timing reference. Improved synchronization may lead to lower power usage by the local device 110a and higher data throughput.

In some implementations, the data exchanged between the local device 110a and the remote device 110b may be embedded in one of the messages during a RACH procedure. For example, the remote device 110b may transmit 306 the timing indication by embedding the timing indication in RACH message 2 (MSG2) or later RACH messages. In other examples, the remote device 110b may provide a TA command including the timing indication. The local device 110a may send 314 the calculated timing offset in RACH MSG3 or MSG4, for example, to the remote device 110b.

Figure 4:
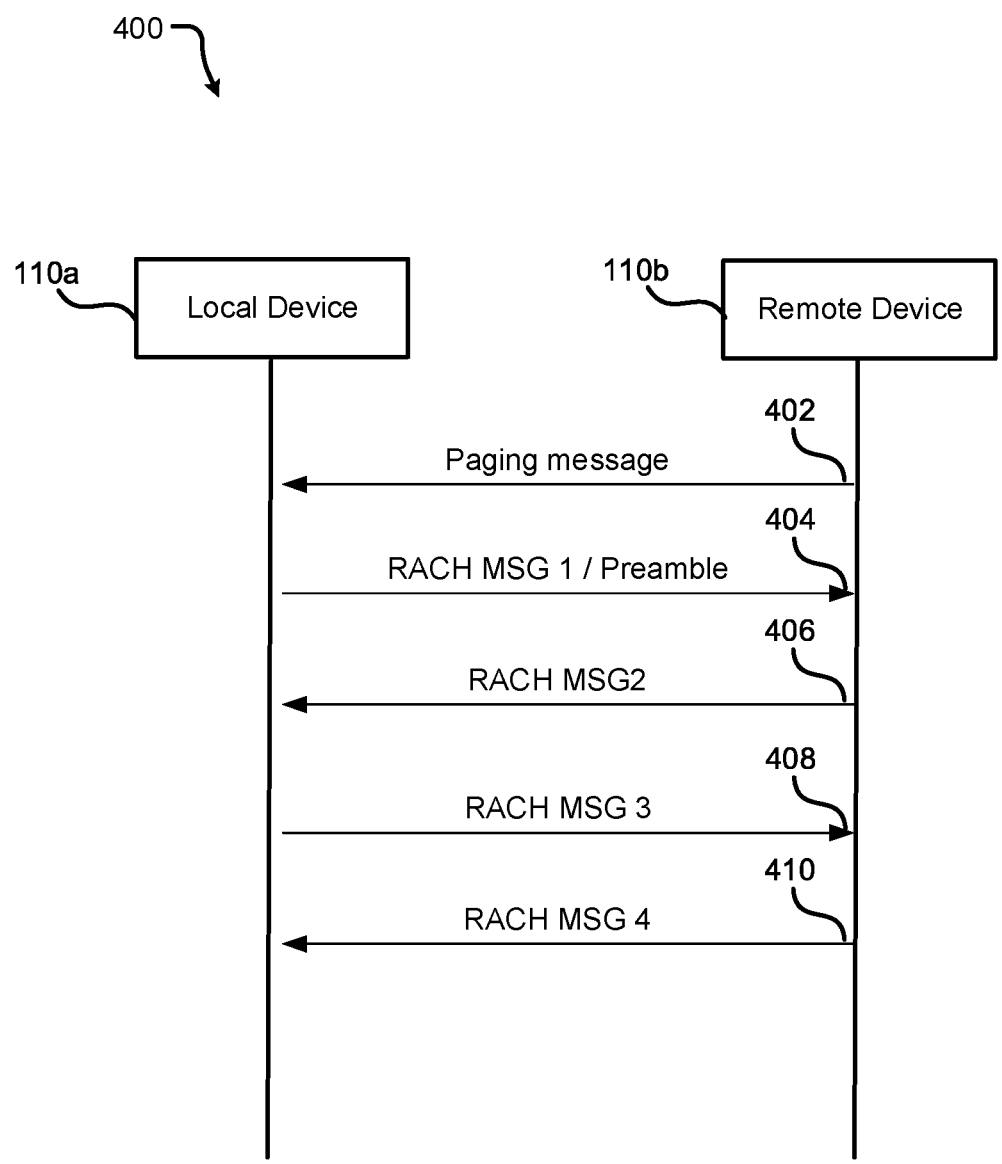
FIG. 4 is an example of a message flow diagram of messages exchanged between two devices during a random access channel (RACH) procedure.

Turning now to FIG. 4, a message flow 400 includes examples of messages exchanged between the local device 110a and the remote device 110b during the RACH procedure. In some implementations, at step 402, the remote device 110b may send a discovery message that is received by the local device 110a. The paging message may include system information broadcasted to the local device 110a, such as the available set of physical random access channel configurations, the available set of random access preambles, the random access response window size, the initial preamble power, the power ramping factor, the maximum number of preamble transmission, and/or the contention resolution timer.

After receiving the paging message, at step 404, the local device 110a may send a MSG1 of the RACH procedure to the remote device 110b. For MSG1 transmissions, the MSG1 may include a preamble index randomly selected by the local device 110a from a predetermined list of preamble indices, for example.

Next, at step 406, the remote device 110b may send a MSG2 to the local device 110a in response to receiving the MSG1. The MSG2 may include a random access response (RAR), which may include a random access radio network temporary identifier (RA-RNTI), a timing advance value, media access control data, a back-off indicator, and/or other information for the local device 110a. The RAR may include a first signal corresponding to a RAR grant on a first physical channel, e.g., the RAR Narrowband Physical Downlink Control Channel (NPDCCH), and a second signal on a second physical channel, e.g., the RAR Narrowband Physical Downlink Shared Channel (NPDSCH).

At step 408, the local device 110a may send a MSG3 that may include a connection request, e.g., a radio resource control (RCC) connection request.

At step 410, the remote device 110b may send a MSG4 to the local device 110a in response to receiving the MSG3. The MSG4 may include an acknowledgement and/or a contention resolution identifier (ID) to alleviate any random access contention the remote device 110b may have with other devices attempting random access.

Figure 5:
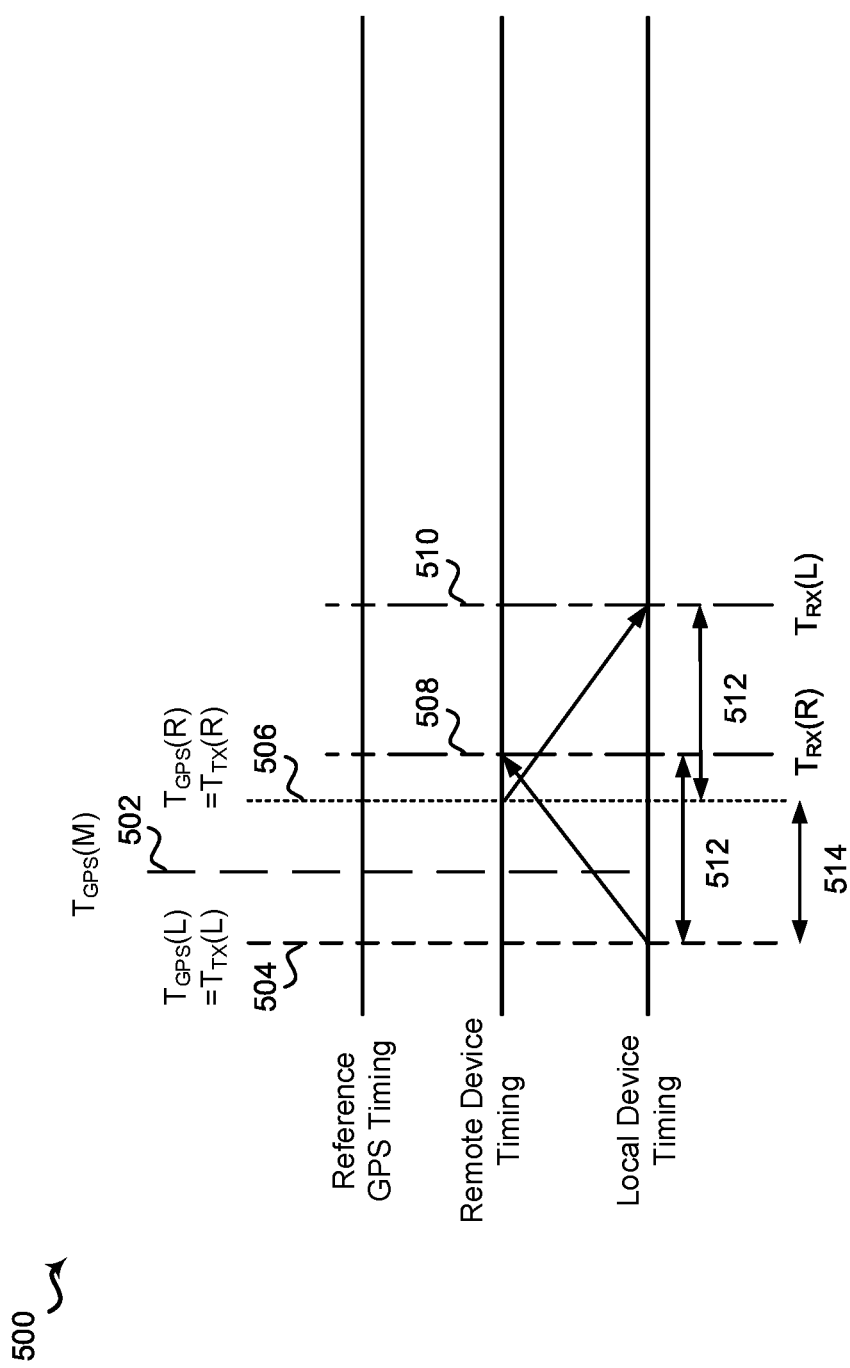
FIG. 5 is a timing diagram of an example of a timing adjustment between two or more devices.

Referring to FIG. 5, an example of a timing diagram 500 illustrates the departure and arrival time of timing reference signals exchanged among the local device 110a, the remote device 110b, and a global positioning system (GPS) source or a cellular source such as the BS 105. The exchange of timing reference signals may be part of a RACH procedure.

For example, the local device 110a may request to communicate with the remote device 110b via RACH. In a non-limiting example, $T_{GPS}(M)$ 502 denotes a master timing reference based on an external synchronization source like GPS. The master timing reference $T_{GPS}(M)$ 502 may be an internal timing reference based on the GPS within the one or more BSs 105. The local internal timing reference $T_{GPS}(L)$ 504 may be an internal timing reference based on the GPS maintained by the local device 110a. The remote internal timing reference $T_{GPS}(R)$ 506 may be an internal timing reference based on the GPS maintained by the remote device 110b. In certain implementations, the local internal timing reference $T_{GPS}(L)$ 504 and the remote internal timing reference $T_{GPS}(R)$ 506 may be different from (have some offset compare to) the master timing reference $T_{GPS}(M)$ 502. In some examples, the local internal timing reference $T_{GPS}(L)$ 504 may be temporally ahead of the master timing reference $T_{GPS}(M)$ 502 and the remote internal timing reference $T_{GPS}(R)$ 506 may be temporally behind the master timing reference $T_{GPS}(M)$ 502. In other examples, the local internal timing reference $T_{GPS}(L)$ 504 may be temporally behind the master timing reference $T_{GPS}(M)$ 502 and the remote internal timing reference $T_{GPS}(R)$ 506 may be temporally ahead of the master timing reference $T_{GPS}(M)$ 502. The local internal timing reference $T_{GPS}(L)$ 504 and the remote internal timing reference $T_{GPS}(R)$ 506 may be separated by a timing offset $\Delta$ 514.

In some implementations, the local Tx timing reference $T_{TX}(L)$ of the local device 105a may be aligned to the local internal timing reference $T_{GPS}(L)$ 504. The local device 105a may utilize the local Tx timing reference $T_{TX}(L)$ to synchronize the transmission of data from the local device 105a. The remote Tx timing reference $T_{TX}(R)$ of the remote device 105b may be aligned to the remote internal timing reference $T_{GPS}(R)$ 506. The remote device 105b may utilize the remote Tx timing reference $T_{TX}(R)$ to synchronize the transmission of data from the remote device 105a.

Still referring to FIG. 5, in certain examples, the local device 110a may send a local timing reference signal to the remote device 110b. The local timing reference signal may arrive at the remote device 110b at a remote Rx timing reference $T_{RX}(R)$ 508, which may be after the local Tx timing reference $T_{TX}(L)$ by a propagation delay $d_{PROP}$ 512. The propagation delay 512 may be the amount of time for the local timing reference signal to travel from the local device 110a to the remote device 110b. The remote device 110b may determine that the remote Rx timing reference $T_{RX}(R)$ 508 occurs $d_{PROP}-\Delta$ after the remote internal timing reference $T_{GPS}(R)$ 506, or mathematically, $T_{GPS}(R)+(d_{PROP}-\Delta)=T_{RX}(R)$.

In certain examples, the remote device 110b may send a remote timing reference signal to the local device 110a. The remote timing reference signal may arrive at the local device 110a at a local Rx timing reference $T_{RX}(L)$ 510, which may be after the remote Tx timing reference $T_{TX}(R)$ by the propagation delay $d_{PROP}$ 512. The propagation delay 512 may be the amount of time for the remote timing reference signal to travel from the remote device 110b to the local device 110a. The local device 110a may determine that the local Rx timing reference $T_{RX}(L)$ 510 occurs $d_{PROP}+\Delta$ after the local internal timing reference $T_{GPS}(L)$ 504, or mathematically, $T_{GPS}(L)+(d_{PROP}+\Delta)=T_{RX}(L)$.

Still referring to FIG. 5, the remote device 110b may send a timing indication to the local device 110a, The timing indication may be embedded in a RACH message, such as a RACH MSG2 or a later message. The timing indication may include the timing difference between $T_{GPS}(R)$ and $T_{RX}(R)$, namely, $d_{PROP}-\Delta$. Upon receiving the timing indication, the local device 110a may calculate the propagation delay 512 based on the received timing indication, the timing difference between $T_{GPS}(L)$ and $T_{RX}(L)$ (i.e. $d_{PROP}+\Delta$), and the following equation: $[(d_{PROP}+\Delta)+(d_{PROP}-\Delta)]/2=d_{PROP}$. Next, the local device 110a may calculate the timing offset $\Delta$ 514 by the following equation: $(d_{PROP}+\Delta)-d_{PROP}=\Delta$. Alternatively, the local device 110a may directly calculate the timing offset $\Delta$ 514 first using the following equation: $[(d_{PROP}+\Delta)-(d_{PROP}-\Delta)]/2=\Delta$. Next, the local device 110a may optionally calculate the propagation delay 512 using the following equation: $(d_{PROP}+-\Delta)-\Delta=d_{PROP}$.

Still referring to FIG. 5, if the local device 110a determines that the local internal timing reference $T_{GPS}(L)$ 504 is more accurate than the remote internal timing reference $T_{GPS}(R)$ 506, the local device 110a may utilize the local internal timing reference $T_{GPS}(L)$ 504 to derive the Tx timing and the Rx timing of the local device 110a. For example, the local device 110a may set the local Tx timing reference $T_{TX}(L)$ at the local internal timing reference $T_{GPS}(L)$ 504 and the local Rx timing reference $T_{RX}(L)$ 510 at a predetermined offset (e.g. $d_{PROP}+\Delta$) after the local internal timing reference $T_{GPS}(L)$ 504.

In some non-limiting implementations, if the local device 110a determines that the local internal timing reference $T_{GPS}(L)$ 504 is less accurate than the remote internal timing reference $T_{GPS}(R)$ 506, the local device 110a may adjust the local internal timing reference $T_{GPS}(L)$ 504 based on the timing offset $\Delta$ 514. For example, the local device 110a may adjust the local internal timing reference $T_{GPS}(L)$ 504 by adding the timing offset $\Delta$ 514 to the local internal timing reference $T_{GPS}(L)$ 504 to create an adjusted local internal timing reference $T_{GPS}(L)'$ (not shown). Consequently, the adjusted local internal timing reference $T_{GPS}(L)'$ may align with the remote internal timing reference $T_{GPS}(R)$ 506. In alternative implementations, the local device 110a may adjust the local internal timing reference $T_{GPS}(L)$ 504 to the adjusted local internal timing reference $T_{GPS}(L)'$ equaling to an average of the local internal timing reference $T_{GPS}(L)$ 504 and the remote internal timing reference $T_{GPS}(R)$ 506. In other implementations, the local device 110a may adjust the local internal timing reference $T_{GPS}(L)$ 504 to the adjusted local internal timing reference $T_{GPS}(L)'$ equaling to a weighted average of the local internal timing reference $T_{GPS}(L)$ 504 and the remote internal timing reference $T_{GPS}(R)$ 506. Other methods for adjusting the local internal timing reference $T_{GPS}(L)$ 504 may be used. The local device 110a may then set an adjusted local Tx timing reference $T_{TX}(L)'$ at the adjusted local internal timing reference $T_{GPS}(L)'$ (e.g. the remote internal timing reference $T_{GPS}(R)$ 506) and an adjusted local Rx timing reference $T_{RX}(L)'$ at a predetermined offset after the adjusted local internal timing reference $T_{GPS}(L)'$. The local device 110a may communicate with the remote device 110b or a third device using the adjusted local internal timing reference $T_{GPS}(L)'$, the adjusted local Rx timing reference $T_{RX}(L)'$, and/or the adjusted local Tx timing reference $T_{TX}(L)'$.

Still referring to FIG. 5, the local device 110a may send the values of the propagation delay $d_{PROP}$ 512 and/or the timing offset $\Delta$ 514 to the remote device 110b. For example, the local device 110a may send the values of $d_{PROP}$ and A in a RACH message, such as a RACH MSG3 or a later message. If the remote device 110b determines that the remote internal timing reference $T_{GPS}(R)$ 506 is more accurate than the local internal timing reference $T_{GPS}(L)$ 504, the remote device 110b may utilize the remote internal timing reference $T_{GPS}(R)$ 504 to derive the Tx timing and the Rx timing of the remote device 110b. For example, the remote device 110b may set the adjusted remote Tx timing reference $T_{TX}(R)$ at the remote internal timing reference $T_{GPS}(R)$ 506 and the remote Rx timing reference $T_{RX}(R)$ 508 at a predetermined offset after the remote internal timing reference $T_{GPS}(R)$ 506 (e.g. $d_{PROP}-\Delta$).

In some non-limiting implementations, if the remote device 110b determines that the remote internal timing reference $T_{GPS}(R)$ 506 is less accurate than the local internal timing reference $T_{GPS}(L)$ 504, the remote device 110b may adjust the remote internal timing reference $T_{GPS}(R)$ 506 based on the timing offset $\Delta$ 514 sent by the local device 110a. For example, the remote device 110b may adjust the remote internal timing reference $T_{GPS}(R)$ 506 by subtracting the timing offset $\Delta$ 514 from the remote internal timing reference $T_{GPS}(R)$ 506 to create an adjusted remote internal timing reference $T_{GPS}(R)'$ (not shown). Consequently, the adjusted remote internal timing reference $T_{GPS}(R)'$ may align with the local internal timing reference $T_{GPS}(L)$ 504. In alternative implementations, the remote device 110b may adjust the remote internal timing reference $T_{GPS}(R)$ 506 to the adjusted local internal timing reference $T_{GPS}(R)'$ equaling to an average of the local internal timing reference $T_{GPS}(L)$ 504 and the remote internal timing reference $T_{GPS}(R)$ 506. In other implementations, the remote device 110b may adjust the remote internal timing reference $T_{GPS}(R)$ 506 to the adjusted remote internal timing reference $T_{GPS}(R)'$ equaling to a weighted average of the local internal timing reference $T_{GPS}(L)$ 504 and the remote internal timing reference $T_{GPS}(R)$ 506. Other methods for adjusting the remote internal timing reference $T_{GPS}(R)$ 506 may be used. The remote device 110b may then set an adjusted remote Tx timing reference $T_{TX}(R)'$ at the adjusted remote internal timing reference $T_{GPS}(R)'$ (e.g. the local internal timing reference $T_{GPS}(L)$ 504) and an adjusted remote Rx timing reference $T_{RX}(R)'$ at a predetermined offset after the adjusted remote internal timing reference $T_{GPS}(R)'$. The remote device 110b may communicate with the local device 110a or a third device using the adjusted remote internal timing reference $T_{GPS}(R)'$, the adjusted remote Rx timing reference $T_{RX}(R)'$, and/or the adjusted remote Tx timing reference $T_{TX}(R)'$.

In certain implementations, the local device 110a may send the timing indication including the timing difference between $T_{GPS}(L)$ and $T_{RX}(L)$, namely, $d_{PROP}+\Delta$, to the remote device 110b. For example, the local device 110a may send the timing difference $d_{PROP}+\Delta$ in a RACH message, such as a RACH MSG3 or a later message. The remote device 110b may derive the propagation delay $d_{PROP}$ 512 and the timing offset $\Delta$ 514 using methods and equations described above. In some examples, remote device 110b may send the calculated values of the propagation delay $d_{PROP}$ 512 and the timing offset $\Delta$ 514 to the local device 110a. For example, the remote device 110b may send the values of $d_{PROP}$ and $\Delta$ in a RACH message, such as a RACH MSG4 or a later message.

In some examples, the local device 110a and/or the remote device 110b may determine the accuracies of the local internal timing reference of the other device (e.g. $T_{GPS}(L)$ 504 and the remote internal timing reference $T_{GPS}(R)$ 506) based on signal-to-noise-interference ratios (SINRs) of signals received from the other device. In some examples, the local 110a and/or the remote device 110b may determine the accuracies of the local internal timing reference based on the quality or power of the signal providing the local internal timing reference (e.g. the signal received from a base-station, or the GPS signal received from the GPS satellites). In some examples, the local 110a and/or the remote device 110b may indicate the determined accuracies of their local internal timing reference to the other device. The indication may be provided in any combination of a discovery message, RACH message, or a later message.

In certain implementations, the local device 110a may send the values of the propagation delay $d_{PROP}$ 512 and/or the timing offset $\Delta$ 514 to a third device. The third device may be a device attempting to communicate with the local device 110a.

Figure 6:
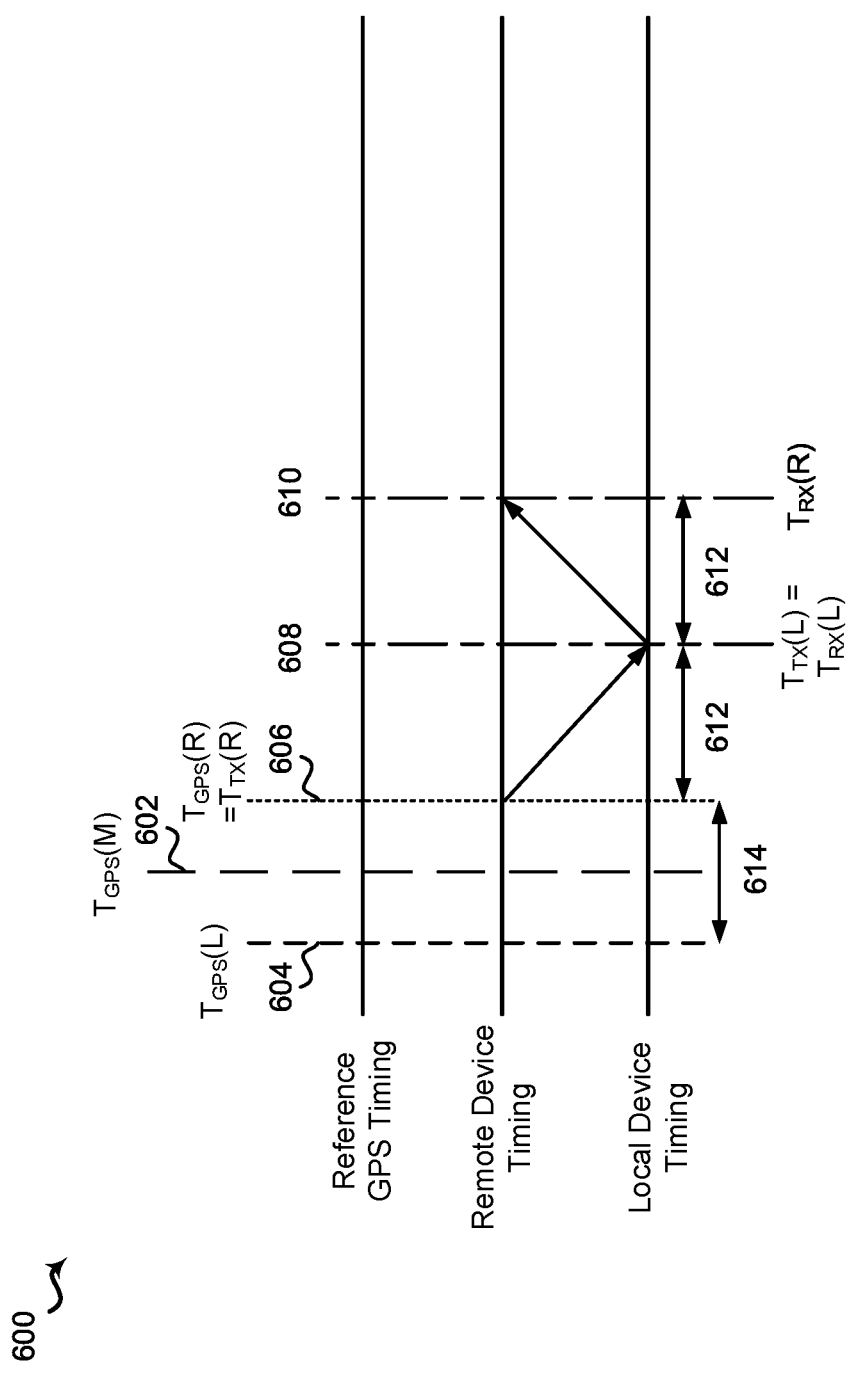
FIG. 6 is a timing diagram of another example of a timing adjustment between two or more devices.

Turning now to FIG. 6, another example of a timing diagram 600 illustrates the departure and arrival time of timing reference signals exchanged among the local device 110a, the remote device 110b, and the GPS source such as the BS 105 or a GPS satellite. The exchange of timing reference signals may be part of a RACH procedure. For example, the local device 110a may request to communicate with the remote device 110b via a RACH procedure. In a non-limiting example, the BS 105 may maintain a master timing reference $T_{GPS}(M)$ 602. Alternatively, $T_{GPS}(M)$ may be provided by the GPS satellite system. The local internal timing reference $T_{GPS}(L)$ 604 may be an internal timing reference maintained by the local device 110a. The remote internal timing reference $T_{GPS}(R)$ 606 may be an internal timing reference maintained by the remote device 110b. In certain implementations, the local internal timing reference $T_{GPS}(L)$ 604 and the remote internal timing reference $T_{GPS}(R)$ 606 may be different from the master timing reference $T_{GPS}(M)$ 602. In some examples, the local internal timing reference $T_{GPS}(L)$ 604 may be temporally ahead of the master timing reference $T_{GPS}(M)$ 602 and the remote internal timing reference $T_{GPS}(R)$ 606 may be temporally behind the master timing reference $T_{GPS}(M)$ 602. In other examples, the local internal timing reference $T_{GPS}(L)$ 604 may be temporally behind the master timing reference $T_{GPS}(M)$ 602 and the remote internal timing reference $T_{GPS}(R)$ 606 may be temporally ahead of the master timing reference $T_{GPS}(M)$ 602. The local internal timing reference $T_{GPS}(L)$ 604 and the remote internal timing reference $T_{GPS}(R)$ 606 may be separated by a timing offset $\Delta$ 614.

Still referring to FIG. 6, the remote device 110b may send a remote timing reference signal to the local device 110a. The remote timing reference signal may arrive at the local device 110a at a local Rx timing reference $T_{RX}(L)$ 608, which may be after the remote Tx timing reference $T_{TX}(R)$ by the propagation delay $d_{PROP}$ 612. The propagation delay 612 may be the amount of time for the remote timing reference signal to travel from the remote device 110b to the local device 110a. The local device 110a may determine that the local Rx timing reference $T_{RX}(L)$ 608 occurs $d_{PROP}+\Delta$ after the local internal timing reference $T_{GPS}(L)$ 604, or mathematically, $T_{GPS}(L)+(d_{PROP}+\Delta)=T_{RX}(L)$.

In certain examples, the local device 110a may send a local timing reference signal to the remote device 110b. The local timing reference signal may arrive at the remote device 110b at a remote Rx timing reference $T_{RX}(R)$ 610, which may be after the local Tx timing reference $T_{TX}(L)$ by a propagation delay $d_{PROP}$ 612. The propagation delay 612 may be the amount of time for the local timing reference signal to travel from the local device 110a to the remote device 110b. The remote device 110b may determine that the remote Rx timing reference $T_{RX}(R)$ 610 occurs $2d_{PROP}$ after the remote internal timing reference $T_{GPS}(R)$ 606, or mathematically, $T_{GPS}(R)+(2d_{PROP})=T_{RX}(R)$.

In certain examples, the local Tx timing reference $T_{TX}(L)$ of the local device 105a may be aligned to the local Rx timing reference $T_{RX}(L)$ 608. The local device 105a may utilize the local Tx timing reference $T_{TX}(L)$ to synchronize the transmission of data from the local device 105a. The remote Tx timing reference $T_{TX}(R)$ of the remote device 105b may be aligned to the remote internal timing reference $T_{GPS}(R)$ 606. The remote device 105b may utilize the remote Tx timing reference $T_{TX}(R)$ to synchronize the transmission of data from the remote device 105a.

Still referring to FIG. 6, the remote device 110b may send a timing indication to the local device 110a, The timing indication may be embedded in a RACH message, such as a RACH MSG2 or a later message. The timing indication may include the timing difference between $T_{GPS}(R)$ and $T_{RX}(R)$, namely, $2d_{PROP}$, or a value based on that, e.g. half of the timing difference, namely $d_{PROP}$. Upon receiving the timing indication, the local device 110a may determine the propagation delay $d_{PROP}$ 612 based on the received timing indication and the following equation: $2d_{PROP}/2=d_{PROP}$. Next, the local device 110a may calculate the timing offset $\Delta$ 614 by the following equation: $(d_{PROP}+\Delta)-d_{PROP}=\Delta$. Alternatively, the local device 110a may directly calculate the timing offset $\Delta$ 614 first using the following equation: $(d_{PROP}+\Delta)-2d_{PROP}/2=\Delta$. Next, the local device 110a may optionally calculate the propagation delay 612 using the following equation: $(d_{PROP}+\Delta)-\Delta=d_{PROP}$.

Still referring to FIG. 6, if the local device 110a determines that the local internal timing reference $T_{GPS}(L)$ 604 is more accurate than the remote internal timing reference $T_{GPS}(R)$ 606, the local device 110a may utilize the local internal timing reference $T_{GPS}(L)$ 604 to derive the Tx timing and the Rx timing of the local device 110a. For example, the local device 110a may set the local Tx timing reference $T_{TX}(L)$ equal to the local Rx timing reference $T_{RX}(L)$ 608.

In some non-limiting implementations, if the local device 110a determines that the local internal timing reference $T_{GPS}(L)$ 604 is less accurate than the remote internal timing reference $T_{GPS}(R)$ 606, the local device 110a may adjust the local internal timing reference $T_{GPS}(L)$ 604 based on the timing offset $\Delta$ 614. For example, the local device 110a may adjust the local internal timing reference $T_{GPS}(L)$ 604 by adding the timing offset $\Delta$ 614 to the local internal timing reference $T_{GPS}(L)$ 604 to create an adjusted local internal timing reference $T_{GPS}(L)'$ (not shown). Consequently, the adjusted local internal timing reference $T_{GPS}(L)'$ may align with the remote internal timing reference $T_{GPS}(R)$ 606. In alternative implementations, the local device 110a may adjust the local internal timing reference $T_{GPS}(L)$ 604 to the adjusted local internal timing reference $T_{GPS}(L)'$ equaling to an average of the local internal timing reference $T_{GPS}(L)$ 604 and the remote internal timing reference $T_{GPS}(R)$ 606. In other implementations, the local device 110a may adjust the local internal timing reference $T_{GPS}(L)$ 604 to the adjusted local internal timing reference $T_{GPS}(L)'$ equaling to a weighted average of the local internal timing reference $T_{GPS}(L)$ 604 and the remote internal timing reference $T_{GPS}(R)$ 606. Other methods for adjusting the local internal timing reference $T_{GPS}(L)$ 604 may be used. The local device 110a may then set an adjusted local Tx timing reference $T_{TX}(L)'$ at the adjusted local internal timing reference $T_{GPS}(L)'$ (e.g. the remote internal timing reference $T_{GPS}(R)$ 606) and an adjusted local Rx timing reference $T_{RX}(L)'$ at a predetermined offset after the adjusted local internal timing reference $T_{GPS}(L)'$. The local device 110a may communicate with the remote device 110b or a third device using the adjusted local internal timing reference $T_{GPS}(L)'$, the adjusted local Rx timing reference $T_{RX}(L)'$, and/or the adjusted local Tx timing reference $T_{TX}(L)'$.

Still referring to FIG. 6, the local device 110a may send the values of the timing offset $\Delta$ 614 to the remote device 110b. For example, the local device 110a may send the value of $\Delta$ in a RACH message, such as a RACH MSG3 or a later message. If the remote device 110b determines that the remote internal timing reference $T_{GPS}(R)$ 606 is more accurate than the local internal timing reference $T_{GPS}(L)$ 604, the remote device 110b may utilize the remote internal timing reference $T_{GPS}(R)$ 604 to derive the Tx timing and the Rx timing of the remote device 110b. For example, the remote device 110b may set the remote Tx timing reference $T_{TX}(R)$ at the remote internal timing reference $T_{GPS}(R)$ 606 and the remote Rx timing reference $T_{RX}(R)$ 610 at a predetermined offset after the remote internal timing reference $T_{GPS}(R)$ 606 (e.g. $2d_{PROP}$).

In some non-limiting implementations, if the remote device 110b determines that the remote internal timing reference $T_{GPS}(R)$ 606 is less accurate than the local internal timing reference $T_{GPS}(L)$ 604, the remote device 110b may adjust the remote internal timing reference $T_{GPS}(R)$ 606 based on the timing offset $\Delta$ 614 sent by the local device 110a. For example, the remote device 110b may adjust the remote internal timing reference $T_{GPS}(R)$ 606 by subtracting the timing offset $\Delta$ 614 from the remote internal timing reference $T_{GPS}(R)$ 606 to create an adjusted remote internal timing reference $T_{GPS}(R)'$ (not shown). Consequently, the adjusted remote internal timing reference $T_{GPS}(R)'$ may align with the local internal timing reference $T_{GPS}(L)$ 604. In alternative implementations, the remote device 110b may adjust the remote internal timing reference $T_{GPS}(R)$ 606 to the adjusted local internal timing reference $T_{GPS}(R)'$ equaling to an average of the local internal timing reference $T_{GPS}(L)$ 604 and the remote internal timing reference $T_{GPS}(R)$ 606. In other implementations, the remote device 110b may adjust the remote internal timing reference $T_{GPS}(R)$ 606 to the adjusted remote internal timing reference $T_{GPS}(R)'$ equaling to a weighted average of the local internal timing reference $T_{GPS}(L)$ 604 and the remote internal timing reference $T_{GPS}(R)$ 606. Other methods for adjusting the remote internal timing reference $T_{GPS}(R)$ 606 may be used. The remote device 110b may then set an adjusted remote Tx timing reference $T_{TX}(R)'$ at the adjusted remote internal timing reference $T_{GPS}(R)'$ (e.g. the local internal timing reference $T_{GPS}(L)$ 604) and an adjusted remote Rx timing reference $T_{RX}(R)'$ at a predetermined offset after the adjusted remote internal timing reference $T_{GPS}(R)'$ (e.g. $2d_{PROP}$). The remote device 110b may communicate with the local device 110a or a third device using the adjusted remote internal timing reference $T_{GPS}(R)'$, the adjusted remote Rx timing reference $T_{RX}(R)'$, and/or the adjusted remote Tx timing reference $T_{TX}(R)'$.

In certain implementations, the local device 110a may send the timing indication including the timing difference between $T_{GPS}(L)$ and $T_{RX}(L)$, namely, $d_{PROP}+\Delta$, to the remote device 110b. For example, the local device 110a may send the timing difference $d_{PROP}+\Delta$ in a RACH message, such as a RACH MSG3 or a later message. The remote device 110b may derive the propagation delay $d_{PROP}$ 612 and the timing offset $\Delta$ 614 using methods and equations described above. In some examples, remote device 110b may send the calculated values of the propagation delay $d_{PROP}$ 612 and/or the timing offset $\Delta$ 614 to the local device 110a. For example, the remote device 110b may send the values of $d_{PROP}$ and/or $\Delta$ in a RACH message, such as a RACH MSG4 or a later message.

In some examples, the local device 110a and/or the remote device 110b may determine the accuracies of the local internal timing reference of the other device (e.g. $T_{GPS}(L)$ 604 and the remote internal timing reference $T_{GPS}(R)$ 606) based on SINRs of signals received from the other device. In some examples, the local 110a and/or the remote device 110b may determine the accuracies of the local internal timing reference based on the quality or power of the signal providing the local internal timing reference (e.g. the signal received from a base-station, or the GPS signal received from the GPS satellites). In some examples, the local 110a and/or the remote device 110b may indicate the determined accuracies of their local internal timing reference to the other device. The indication may be provided in any combination of a discovery message, RACH message, or a later message.

In certain implementations, the local device 110a may send the values of the propagation delay $d_{PROP}$ 612 and/or the timing offset Δ 614 to a third device. The third device may be a device attempting to communicate with the local device 110a.

Figure 7:
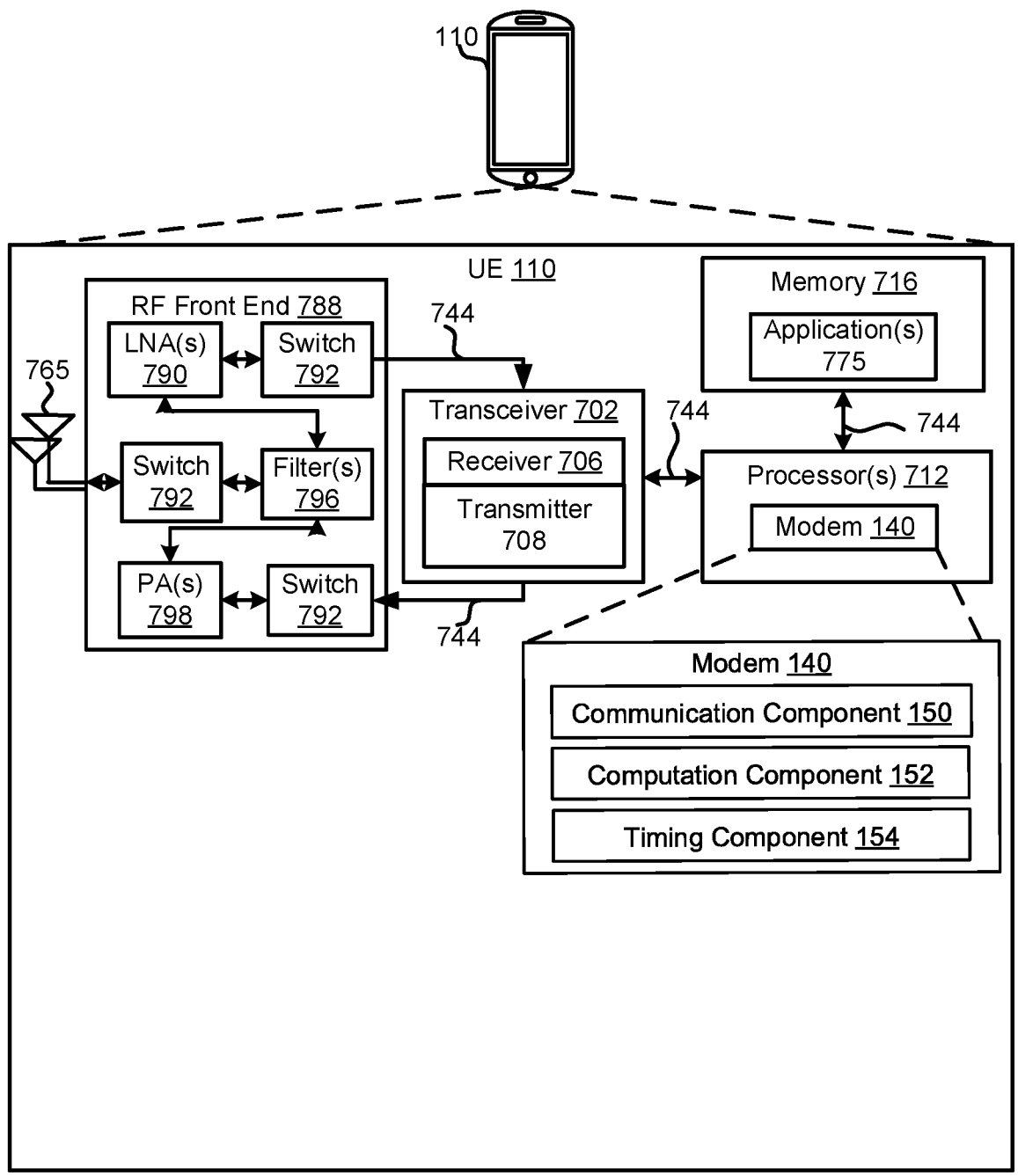
FIG. 7 is a schematic diagram of an example of a user equipment or a device.

Referring to FIG. 7, one example of an implementation of the UE 110 (such as the local device 110a and the remote device 110b) and may include a variety of components, some of which have already been described above, but including components such as one or more processors 712 and memory 716 and transceiver 702 in communication via one or more buses 744, which may operate in conjunction with the modem 140, the communication component 150, the computation component 152, and the timing component 154 to enable one or more of the functions described herein related to communicating with the BS 105. Further, the one or more processors 712, modem 140, memory 716, transceiver 702, RF front end 788 and one or more antennas 765, may be configured to support voice and/or data calls (simultaneously or non-simultaneously) in one or more radio access technologies.

In an aspect, the one or more processors 712 may include the modem 140 that uses one or more modem processors. The various functions related to the communication component 150, the computation component 152, and the timing component 154 may be included in the modem 140 and/or processors 712 and, in an aspect, may be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. Additionally, the modem 140 may configure the UE 110 (such as the local device 110a and the remote device 110b) along with the configuration component 152 and the processors 712. In other aspects, some of the features of the one or more processors 712 and/or the modem 140 associated with the communication component 150 may be performed by transceiver 702.

Also, memory 716 may be configured to store data used herein and/or local versions of applications 775 or the communication component 150 and/or one or more subcomponents of the communication component 150 being executed by at least one processor 712. Memory 716 may include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining the communication component 150 and/or one or more of its subcomponents, and/or data associated therewith, when UE 110 is operating at least one processor 712 to execute the communication component 150, the computation component 152, and the timing component 154 and/or one or more of their subcomponents.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a RF receiver. In an aspect, receiver 706 may receive signals transmitted by at least one base station 105. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter.

Moreover, in an aspect, UE 110 may include RF front end 788, which may operate in communication with one or more antennas 765 and transceiver 702 for receiving and transmitting radio transmissions, for example, wireless communications transmitted by at least one base station 105 or wireless transmissions transmitted by UE 110. RF front end 788 may be coupled with one or more antennas 765 and may include one or more low-noise amplifiers (LNAs) 790, one or more switches 792, one or more power amplifiers (PAs) 798, and one or more filters 796 for transmitting and receiving RF signals.

In an aspect, LNA 790 may amplify a received signal at a desired output level. In an aspect, each LNA 790 may have a specified minimum and maximum gain values. In an aspect, RF front end 788 may use one or more switches 792 to select a particular LNA 790 and the specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and the specified gain value based on a desired gain value for a particular application.

Also, for example, one or more filters 796 may be used by RF front end 788 to filter a received signal to obtain an input RF signal. Similarly, in an aspect, for example, a respective filter 696 may be used to filter an output from a respective PA 798 to produce an output signal for transmission. In an aspect, each filter 796 may be coupled with a specific LNA 790 and/or PA 798. In an aspect, RF front end 788 may use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver may be tuned to operate at specified frequencies such that UE 110 may communicate with, for example, one or more base stations 105 or one or more cells associated with one or more base stations 105. In an aspect, for example, the modem 140 may configure transceiver 702 to operate at a specified frequency and power level based on the UE configuration of the UE 110 and the communication protocol used by the modem 140.

In an aspect, the modem 140 may be a multiband-multimode modem, which may process digital data and communicate with transceiver 702 such that the digital data is sent and received using transceiver 702. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of UE 110 (e.g., RF front end 788, transceiver 702) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network during cell selection and/or cell reselection.

Figure 8:
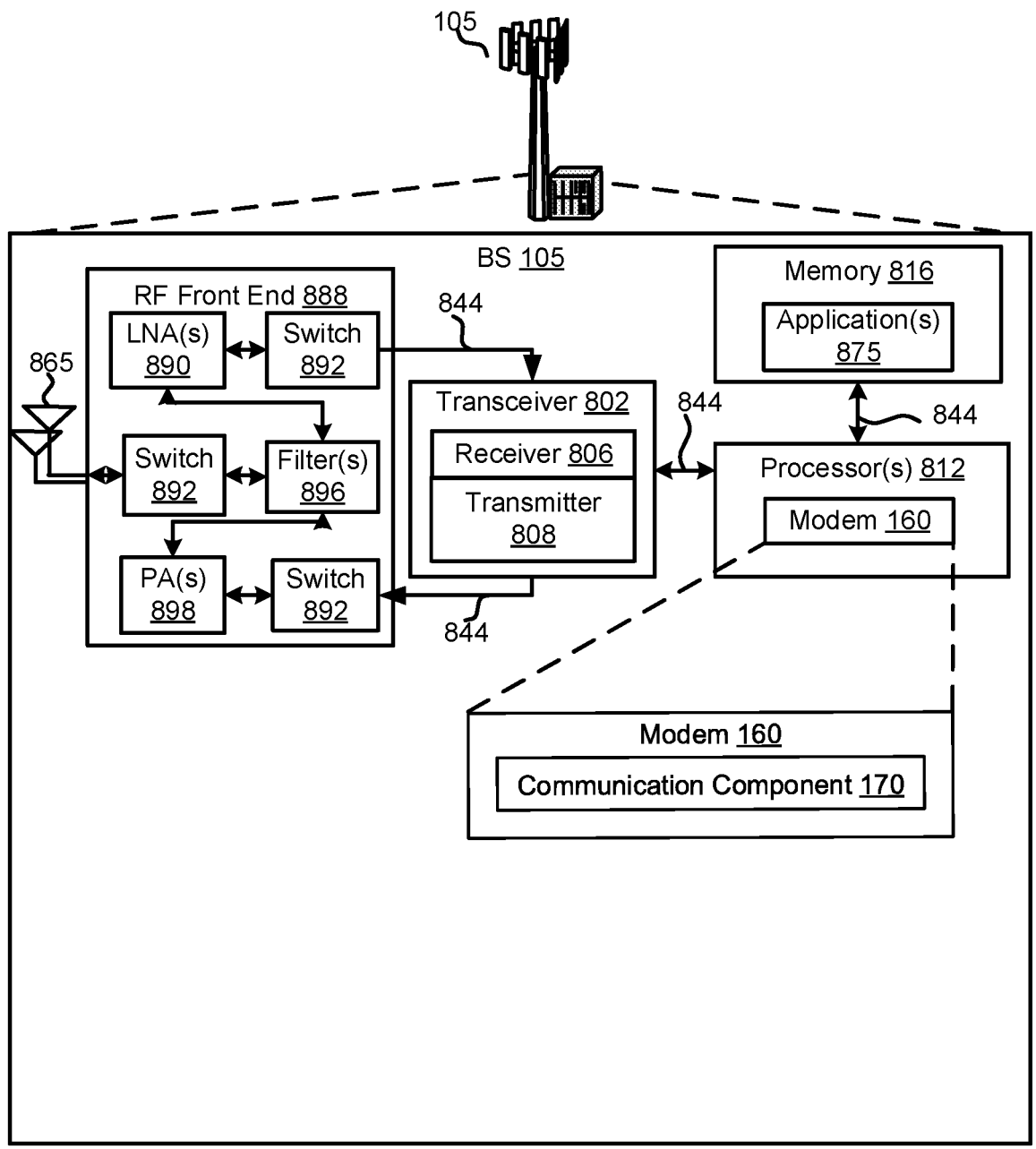
FIG. 8 is a schematic diagram of an example of a base station.

Referring to FIG. 8, one example of an implementation of base station 105 may include a variety of components, some of which have already been described above, but including components such as one or more processors 812 and memory 816 and transceiver 802 in communication via one or more buses 844, which may operate in conjunction with the modem 160, the communication component 170 enable one or more of the functions described herein related to initialization of UEs 110. The transceiver 802, receiver 806, transmitter 808, one or more processors 812, memory 816, applications 875, buses 844, RF front end 888, LNAs 890, switches 892, filters 896, PAs 898, and one or more antennas 865 may be the same as or similar to the corresponding components of the UE 110, as described above, but configured or otherwise programmed for base station operations as opposed to UE operations. For example, the communication component 170 may perform the communication procedure with the modem 160 and the processors 812.

For example, the one or more processors 812 may include the modem 160 that uses one or more modem processors. The various functions related to the BS communication component 170 may be included in modem 160 and/or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In certain aspects, various functions relating to the BS communication component 170 may be implemented in hardware, software, or a combination thereof. In other aspects, some of the features of the one or more processors 812 and/or the modem 160 associated with the BS communication component 170 may be performed by transceiver 802.

Also, memory 816 may be configured to store data used herein and/or local versions of applications 875 or the BS communication component 170 and/or one or more subcomponents of the BS communication component 170 being executed by at least one processor 812. Memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining the BS communication component 170 and/or one or more of its subcomponents, and/or data associated therewith, when BS 105 is operating at least one processor 812 to execute the BS communication component 170 and/or one or more of their subcomponents.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). The receiver 806 may be, for example, a RF receiver. In an aspect, the receiver 806 may receive signals transmitted by the BS 105. Additionally, the receiver 806, in conjunction with the computation component 150, may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, the BS 105 may include RF front end 888, which may operate in communication with one or more antennas 865 and transceiver 802 for receiving and transmitting radio transmissions, for example, wireless communications transmitted by the UE 80/BS 105 or wireless transmissions transmitted by UE 80/BS 105. RF front end 888 may be coupled with one or more antennas 865 and may include one or more low-noise amplifiers (LNAs) 890, one or more switches 892, one or more power amplifiers (PAs) 898, and one or more filters 896 for transmitting and receiving RF signals.

In an aspect, LNA 890 may amplify a received signal at a desired output level. In an aspect, each LNA 890 may have a specified minimum and maximum gain values. In an aspect, RF front end 888 may use one or more switches 892 to select a particular LNA 890 and the specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and the specified gain value based on a desired gain value for a particular application.

Also, for example, one or more filters 896 may be used by RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be coupled with a specific LNA 890 and/or PA 898. In an aspect, RF front end 888 may use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that BS 105 may communicate with, for example, the UE 110/BS 105 or one or more neighboring cells. In an aspect, for example, the modem 160 may configure transceiver 802 to operate at a specified frequency and power level based on the BS configuration of the BS 105 and the communication protocol used by the modem 160.

In an aspect, the modem 160 may be a multiband-multimode modem, which may process digital data and communicate with transceiver 802 such that the digital data is sent and received using transceiver 802. In an aspect, the modem 160 may be multiband and be configured to support multiple frequency bands for a specific communications protocol. In an aspect, the modem 160 may be multimode and be configured to support multiple operating networks and communications protocols. In an aspect, the modem 160 may control one or more components of BS 105 (e.g., RF front end 888, transceiver 802) to enable transmission and/or reception of signals from the network based on a specified modem configuration. In an aspect, the modem configuration may be based on the mode of the modem and the frequency band in use. In another aspect, the modem configuration may be based on BS configuration information associated with BS 105 as provided by the network during cell selection and/or cell reselection.

Figure 9:
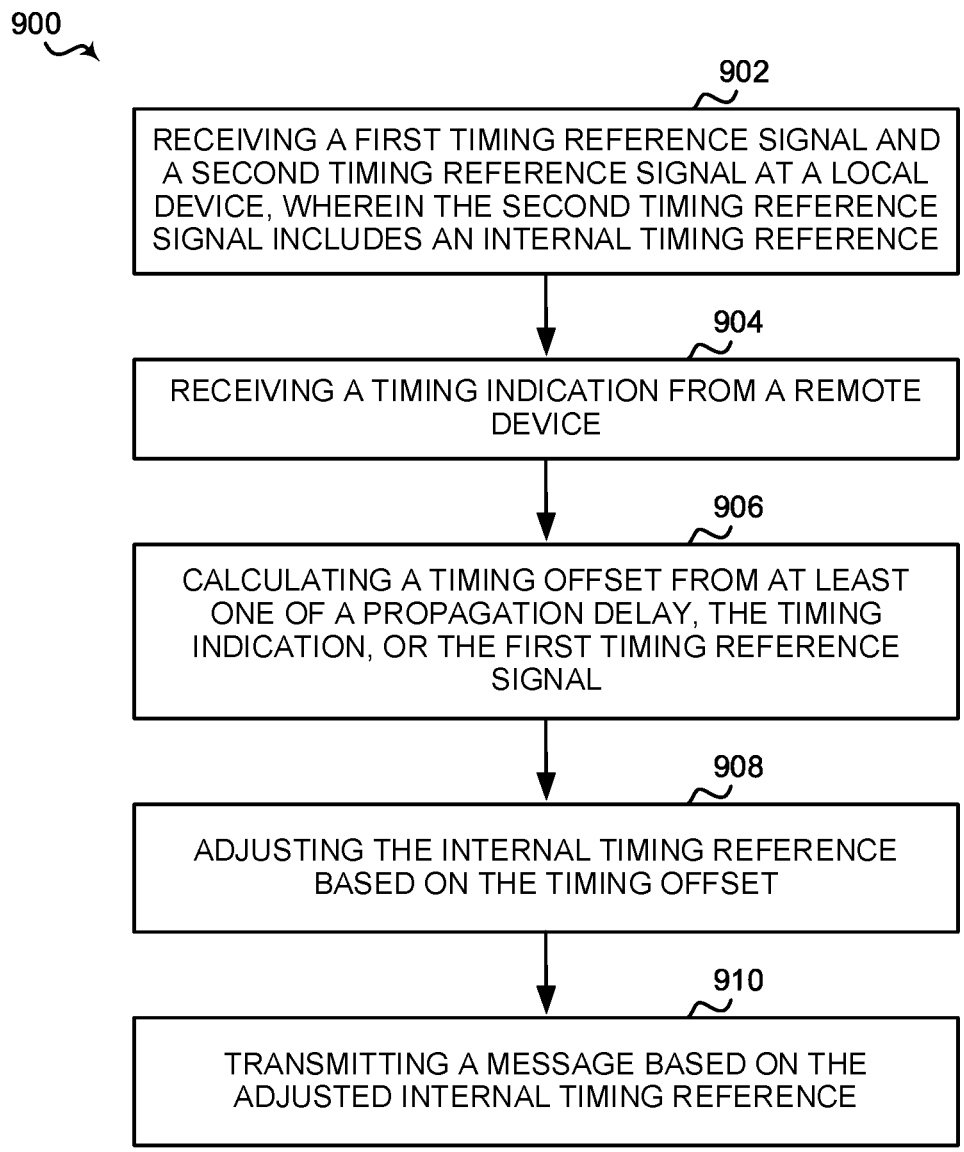
FIG. 9 is a process flow diagram of an example of a method for performing timing adjustment by a device.

Referring now to FIG. 9, the UE 110, such as the local device 110a or the remote device 110b, may perform an example of a method 900 of wireless communications including adjusting the Rx and Tx timing using an external reference.

At block 902, the method 900 may receive a first timing reference signal and a second timing reference signal at a local device, wherein the second timing reference signal includes an internal timing reference. For example, the communication component 150 of the local device 110a may receive a remote timing reference signal from the remote device 110b and an internal timing reference signal based on GPS or cellular timing. The internal timing reference signal may establish an internal timing reference within the local device 110a. The internal timing reference signal may be sent by the communication component 170 of the BS 105 and/or a satellite. In an example, the remote timing reference signal may indicate to the local device 110a that $T_{RX}(L)=T_{GPS}(L)+(d_{PROP}+\Delta)$.

At block 904, the method 900 may receive a timing indication from a remote device. For example, the communication component 150 of the local device 110a may receive a timing indication including a propagation delay. In an example, the timing indication may include the value of $2d_{PROP}$.

In an optional implementation, the method 900 may determine a propagation delay from at least one of the first timing reference signal and the timing indication. For example, the computation component 152 of the local device 110a may determine the propagation based on the information in the timing indication. In an example, the propagation delay may be determined by dividing the value of $2d_{PROP}$ by 2.

At block 906, the method 900 may calculate a timing offset from at least one of the propagation delay, the timing indication, or the first timing reference signal. For example, the computation component 152 of the local device 110a may calculate a timing offset from at least one of the propagation delay, the timing indication, or the remote timing reference signal. In an example, the computation component 152 may calculate the timing offset by subtracting $d_{PROP}+\Delta$ by $d_{PROP}$.

At block 908, the method 900 may adjust the internal timing reference based on the timing offset. For example, the timing component 154 may adjust the internal timing reference of the local device 110a based on the timing offset. The timing component 154 may adjust the internal timing reference after determining that the internal timing reference of the local device 110a is less accurate than the remote timing reference.

At block 910, the method 900 may transmit a message based on the internal timing reference. For example, the communication component 150 may transmit a message based on the adjusted internal timing reference, and more specifically, the Tx timing of the local device 110a, to the remote device 110b or to a third device.

Figure 10:
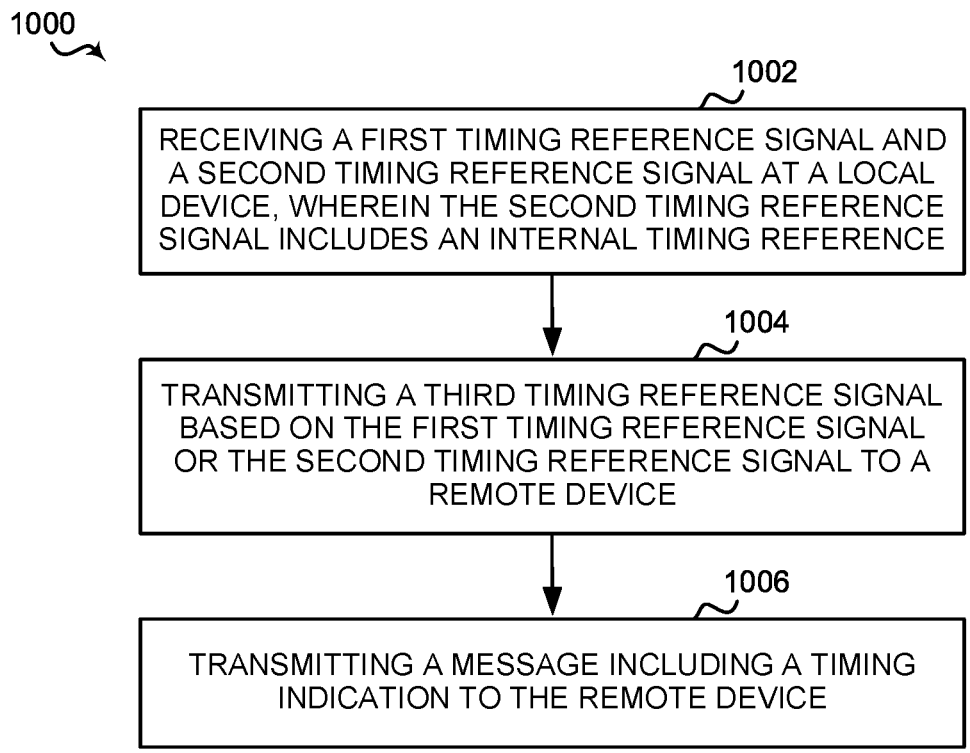
FIG. 10 is a process flow diagram of an example of a method for transmitting timing references to a device.

Referring now to FIG. 10, the UE 110, such as the local device 110a or the remote device 110b, may perform an example of a method 1000 of wireless communications including transmitting timing references to another device, e.g. the remote device 110b.

At block 1002, the method 1000 may receive a first timing reference signal and a second timing reference signal at a local device, wherein the second timing reference signal includes an internal timing reference. For example, the communication component 150 of the local device 110a may receive a remote timing reference signal from the remote device 110b and an internal timing reference signal based on GPS or cellular timing. The internal timing reference signal may establish an internal timing reference within the local device 110a. The internal timing reference signal may be sent by the communication component 170 of the BS 105 and/or a satellite. In an example, the remote timing reference signal may indicate to the local device 110a that $T_{RX}(L)=T_{GPS}(L)+(d_{PROP}+\Delta)$.

At block 1004, the method 1000 may transmit a third timing reference signal based on the first timing reference signal or the second timing reference signal to a remote device. For example, the communication component 150 of the local device 110a may transmit the local timing reference signal based on the remote timing reference signal (e.g. indicating $T_{RX}(L)=T_{GPS}(L)+(d_{PROP}+\Delta)$). The local timing reference signal may indicate to the remote device 110b that $T_{RX}(R)=T_{GPS}(R)+2d_{PROP}$.

At block 1006, the method 1000 may transmit a message including a timing indication to a remote device. For example, the communication component 150 of the local device 110a may transmit a message including the propagation delay. In an example, the message may include a value of $d_{PROP}$, $2d_{PROP}$, or other multiples of $d_{PROP}$.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
receiving a first timing reference signal and a second timing reference signal at a local device, wherein the second timing reference signal includes an internal timing reference;
receiving a timing indication from a remote device, wherein the timing indication includes a value equaling to twice a propagation delay;
determining the propagation delay by dividing the value by 2;
calculating a timing offset by subtracting an arrival time of the first timing reference signal by the propagation delay;
adjusting the internal timing reference based on the timing offset; and
transmitting a message based on the adjusted internal timing reference.

2. The method of claim 1, wherein the second timing reference signal includes a global positioning system (GPS) signal.

3. The method of claim 1, further comprising determining, prior to adjusting the internal timing reference, that an external timing reference is more accurate than the internal timing reference.

4. The method of claim 1, further comprising sending the calculated timing offset to the remote device.

5. The method of claim 1, further comprising communicating with a third device based on the internal timing reference.

6. The method of claim 1, further comprising sending the calculated timing offset to a third device.

7. The method of claim 1, further comprising receiving second message from the remote device based on the internal timing reference.

8. A method of wireless communication, comprising:
receiving a first timing reference signal and a second timing reference signal at a local device, wherein the second timing reference signal includes an internal timing reference;
receiving a timing indication from a remote device, wherein the timing indication includes a value equaling to a sum of a propagation delay and a timing offset;
determining the propagation delay by dividing an arrival time of the first timing reference signal by 2;
calculating the timing offset by subtracting the value by the propagation delay;
adjusting the internal timing reference based on the timing offset and
transmitting a message based on the adjusted internal timing reference.

9. The method of claim 8, further comprising determining, prior to adjusting the internal timing reference, that an external timing reference is more accurate than the internal timing reference.

10. The method of claim 8, further comprising sending the calculated timing offset to the remote device.

11. The method of claim 8, further comprising communicating with a third device based on the internal timing reference.

12. The method of claim 8, further comprising sending the calculated timing offset to a third device.

13. The method of claim 8, further comprising receiving second message from the remote device based on the internal timing reference.

14. A method of wireless communication, comprising:
receiving a first timing reference signal and a second timing reference signal at a local device, wherein the second timing reference signal includes an internal timing reference;
receiving a timing indication from a remote device, wherein the timing indication includes a value equaling to a difference of a propagation delay and a timing offset;
calculating the timing offset by dividing a difference of an arrival time of the first timing reference signal and the value by 2;
adjusting the internal timing reference based on the timing offset; and
transmitting a message based on the adjusted internal timing reference.

15. The method of claim 14, further comprising:
determining, prior to adjusting the internal timing reference, that an external timing reference is more accurate than the internal timing reference.

16. The method of claim 14, further comprising sending the calculated timing offset to the remote device.

17. The method of claim 14, further comprising communicating with a third device based on the internal timing reference.

18. The method of claim 14, further comprising sending the calculated timing offset to a third device.

19. The method of claim 14, further comprising receiving second message from the remote device based on the internal timing reference.

20. A method of wireless communication, comprising:
receiving a first timing reference signal and a second timing reference signal at a local device, wherein the second timing reference signal includes an internal timing reference;
receiving a timing indication from a remote device, wherein the timing indication includes a value equaling to a sum of a propagation delay and a timing offset;
calculating the timing offset by dividing a difference of the value and an arrival time of the first timing reference signal by 2;
adjusting the internal timing reference based on the timing offset; and
transmitting a message based on the adjusted internal timing reference.

21. The method of claim 20, further comprising determining, prior to adjusting the internal timing reference, that an external timing reference is more accurate than the internal timing reference.

22. The method of claim 20, further comprising sending the calculated timing offset to the remote device.

23. The method of claim 20, further comprising communicating with a third device based on the internal timing reference.

24. The method of claim 20, further comprising sending the calculated timing offset to a third device.

25. The method of claim 20, further comprising receiving second message from the remote device based on the internal timing reference.

26. A local device, comprising
a memory;
a transceiver; and
one or more processors operatively coupled with the memory and the transceiver, the one or more processors being configured to:
receive, via the transceiver, a first timing reference signal and a second timing reference signal at the local device, wherein the second timing reference signal includes an internal timing reference;
receive, via the transceiver, a timing indication from a remote device, wherein the timing indication includes a value equaling to twice a propagation delay;
determine a propagation delay by dividing the value by 2;
calculate a timing offset by subtracting an arrival time of the first timing reference signal by the propagation delay;
adjust the internal timing reference based on the timing offset; and
transmit, via the transceiver, a message based on the adjusted internal timing reference.

27. A non-transitory computer-readable medium having instructions stored therein that, when executed by one or more processors of a local device, cause the one or more processors to:

receive a first timing reference signal and a second timing reference signal at the local device, wherein the second timing reference signal includes an internal timing reference;

receive a timing indication from a remote device, wherein the timing indication includes a value equaling to twice a propagation delay;

determining the propagation delay by dividing the value by 2;

calculate a timing offset by subtracting an arrival time of the first timing reference signal by the propagation delay;

adjust the internal timing reference based on the timing offset; and transmit a message based on the adjusted internal timing reference.

* * * * *